May 7, 1963
R. E. SELF ETAL
3,088,442
METALLIC SHAFT SEAL
Filed Jan. 6, 1961
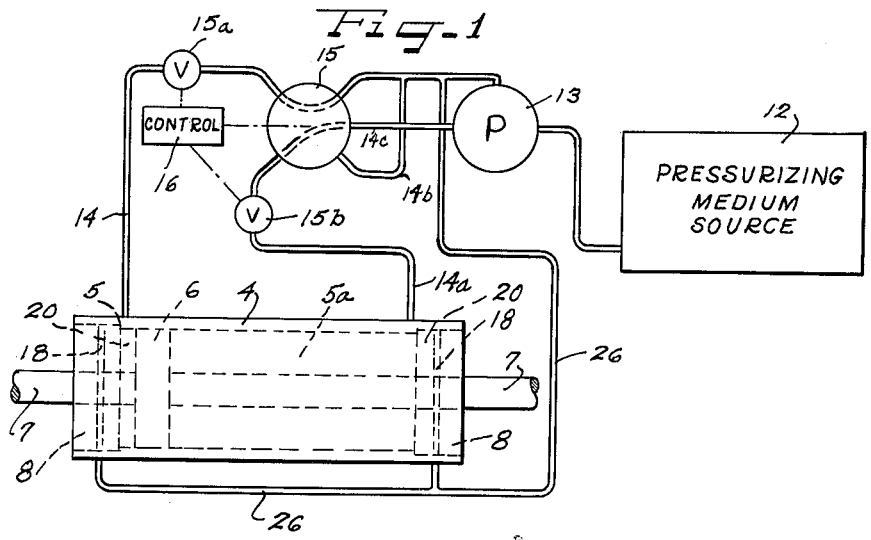
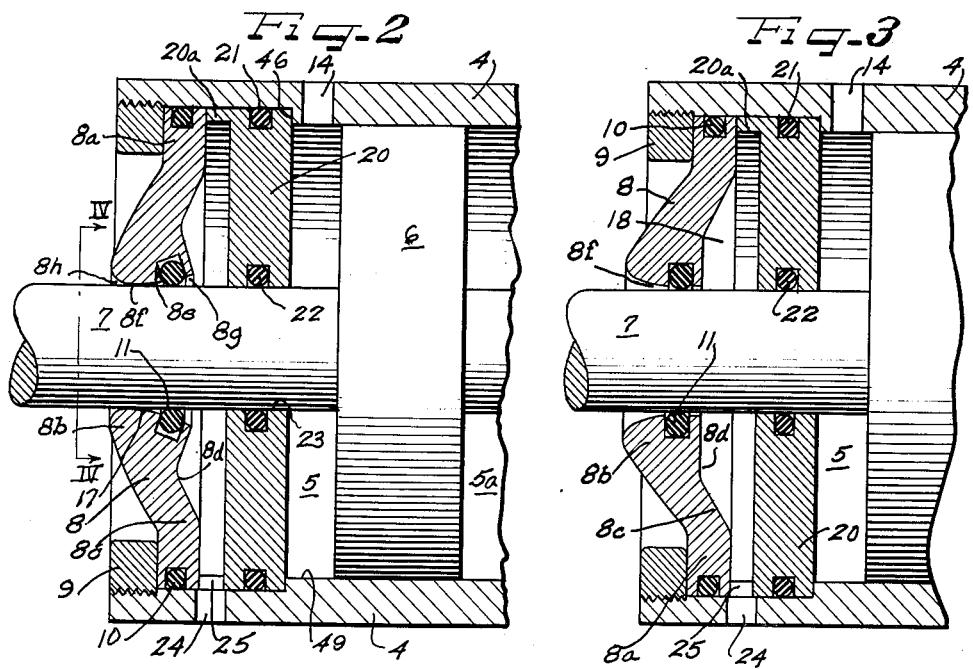
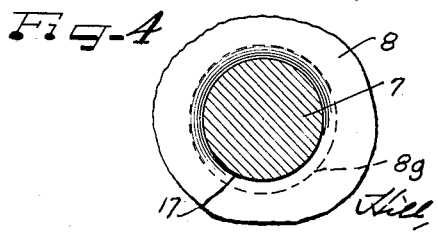
INVENTOR.
Richard E. Self
Arthur R. Allen
BY
ATTORNEYS

United States Patent Office 3,088,442
Patented May 7, 1963

3,088,442
METALLIC SHAFT SEAL
Richard E. Self, Los Alamitos, and Arthur R. Allan, Glendora, Calif., assignors to Thompson Ramo Wooldridge Inc., Cleveland, Ohio, a corporation of Ohio
Filed Jan. 6, 1961, Ser. No. 81,132
13 Claims. (Cl. 121—38)

This invention relates to seal means and is more particularly directed to improved methods and means for sealing reciprocating actuators employed with rockets, missiles and related air and space-borne vehicles.

Heretofore, pneumatically and hydraulically operated servo mechanisms have been employed for actuation of flight stabilization and control components, such as ailerons and other flight control apparatus of rockets, missiles and related air and space-borne vehicles.

Prior attempts to provide reliable sealing for the reciprocating actuator housing pressure compartments included employment of shaft seal means seated in grooves provided in the end caps of the actuator unit.

The seal means prevented gas leakage from the pressurizable compartments in the actuator unit along the shaft through the bore formed in the end plate. These seal means, however, were subjected to corrosion and breakdown from such foreign substances as sand, grit, dust, microbial agents and such gaseous agents as ozone and subliming in a high vacuum, since they were exposed to the atmosphere.

Since the necessary tolerance space between the end plate bore surface and shaft (to permit reciprocation of the shaft) was open to the atmosphere, any dirt, sand or grit which passed through this space and lodged against the shaft seal means seated in the end plate would, when the actuator shaft was reciprocating, tend to lap both the shaft and the seal means cutting both, and eventually resulting in seal means breakdown and shaft misalignment. The possibility of such foreign matter becoming lodged in the clearance space between the shaft and the bore of the end plates is particularly enhanced, where the actuator unit is scheduled for storage over a considerable period of time. Thus, the reliability requirements for actuator unit missile applications necessitated that special packaging, handling and storage methods be employed.

Breakdown of the seal in operation would result in metal-to-metal contact between the rotor shaft and seal and eventually result in breakdown of the actuator assembly. For satellite and missile applications, the end result is readily apparent.

We substantially eliminate the difficulties and problems of the prior art with our invention, wherein each of the end plates, constructed of metal or other suitable material; is provided with a shaft receiving bore of such a configuration as to engage the shaft and prevent passage of foreign substances into the pressure chambers of the unit while in storage, and which is operatively responsive to the high pressure forces developed in the actuator pressure compartments during operation to rock from contact with the shaft to thereby permit the shaft to reciprocate.

It is therefore an object of the present invention to provide linear servo mechanism actuator means having end plates adapted to seal the reciprocating shaft and pressure compartments of the actuator means during storage and to permit unhindered operation of the shaft while reciprocating under operating conditions.

It is another object of the present invention to provide means to protect shaft seals of linear servo mechanism actuators and the like.

It is another object of the present invention to provide sealing means for actuator units while stored under non-operative conditions and which permit unhindered reciprocal movement of the actuator shaft under operating conditions without the requirement for the removal, addition or adjustment of actuator components.

It is another object of the present invention to provide a method of sealing linear servo mechanism actuator units.

It is a further object of the present invention to provide means for sealing actuator units which are simple and compact in construction and efficient in operation.

These and other objects, features and advantages of the present invention will become more apparent upon a careful consideration of the following detailed description illustrating a preferred embodiment of our invention, when considered in conjunction with the accompanying drawings wherein like reference numerals and characters refer to like or corresponding parts throughout the several views.

On the drawing:

FIGURE 1 is a view in longitudinal section of a preferred embodiment of a linear servo mechanism actuator unit constructed in accordance with the principles of the present invention;

FIGURE 2 is an enlarged, fragmentary longitudinal cross section view of the left hand end of the actuator unit of FIGURE 1;

FIGURE 3 is an enlarged fragmentary view illustrating the function of the end plate when subjected to the high pressures in the pressure compartments of the actuator unit.

FIGURE 4 is an enlarged fragmentary view in partial elevation taken along lines IV—IV of FIGURE 2.

As shown on the drawing:

Briefly stated, while the present invention has a variety of applications, the drawing hereof illustrates the principles of the invention as they relate to a method and means for protecting reciprocal shaft seal means of linear actuator units and the like. As shown in FIGURE 1, the actuator unit generally includes a housing 4 defining a chamber separated into a pair of pressurizable compartments 5 and 5a by a movable piston head 6 carried by a reciprocable shaft 7.

Inwardly of each end of the housing 4, the housing chamber is closed by an end plate 8 which is centrally bored to receive and permit reciprocable movement of the shaft 7 therethrough. Each of the end plates 8 may be retained in the housing chamber by a ring member 9 which may be formed integral with the end plate, or which may be a separate member as shown in the drawing, and which may be in threaded engagement with the housing 4 as appears in FIGURES 2 and 3. Adjacent the housing, the end plates 8 are each provided with an annular peripheral groove to receive a seal 10 of conventional construction for preventing leakage of the pressurizing medium from the compartments 5 and 5a across the peripheries of the end plates.

As shown in FIGURES 2 and 3, the end plates 8 may be provided with a peripheral flange 8a and with an outer frusto-conical surface 8b. The opposed major surface 8c of the plate is of irregular contour including an inner annular groove 8d for purposes hereinafter described. The end plate 8 is also provided with a groove 8e for receiving a shaft seal 11.

The bore 8f of each end plate 8 is of irregular contour and is sized to contact the shaft 7, as appears in FIGURE 2 when the actuator assembly 4 is in storage thus preventing dirt, grit and other foreign matter from becoming lodged against the shaft seal 11. The end plate bore 8f (FIGURE 4) comprises an entrance portion 8g which is conical in section. The exit portion 8h of the bore 8f is also conically shaped. The throat portion 17 of the bore 8f is sized to contact the shaft 7, as aforesaid, when the actuator assembly is in storage. The contour of the bore 8f also permits the end plate to rock out of contact with the shaft when the actuator assembly is in operation and the end plates 8 are subjected to the high pressures developed in the chambers 18 defined by the end plates 8 and a pair of spacer members 20, each of which carries an annular flange 20a. Appropriate seals 21 and 22 are seated in annular grooves formed in the plates 20 to permit reciprocation of the shaft 7 through the bore 23 thereof. The pressurizing medium is introduced into the chambers 18 through a passage 24 formed in the housing 4 and a complementary passage 25 formed in the flanged portion 20a of the spacer member 20.

The passages 24 communicate through a conduit 26 (FIGURE 1) connected by an appropriate fitting to the output side of the pump 13.

Thus when the high pressure forces acting in the chamber 18 rock the end plate 8 to the position shown in FIGURE 3, the seal 11 is in contact with the shaft and prevents pressure leakage across the shaft 7. When in the position shown in FIGURE 3, the end plate is no longer in contact with the shaft and thus the shaft is free to reciprocate. When the pressure in the chambers 18 is reduced, the end plates 8 are then rocked back into contact with the shaft 7 and effectively prevent foreign matter from entering between the shaft and end plate and from becoming lodged against the shaft seal 11.

A suitable environment for the actuator unit of the present invention is shown in FIGURE 1 wherein the actuator unit 4 is associated with a pressurizing medium source 12. A conventional pump 13 is provided to supply the pressurizing medium to the compartments 5 and 5a through the conduits 14 and 14a. Valve means 15 may be employed as a main control for flow of the pressurizing medium to the compartments 5 and 5a respectively. Valve means 15a and 15b may be provided to control flow of the pressurizing medium in conduits 14 and 14a and may also include a dumping feature for purging the system upon completion of the operation thereof. Automatic control means 16 may be provided to control flow of the pressurizing medium in conduits 14 and 14a downstream of the pump 13 to vary pressure conditions in the compartments 5 and 5a thereby causing reciprocation of the shaft 7. The control means 16 may be any conventional manual or automatic means which may be responsive to a signal received from a remote source, such as the auto pilot system of the vehicle in which the linear servomechanism is employed. The shaft 7 may be coupled at one end to a flight control surface or other vehicle attitude control means such as a gimbaled thrust nozzle on a rocket, missile or satellite (not shown).

In operation, the end plate 8 is shown in the position appearing in FIGURE 2 in contact with the shaft 7. The pressurizing gas pump 13 is normally closed and may be actuated by the control means 16 to permit flow of the pressurizing medium from the source 12 through conduits 14 and 14a. The main valve 15 may then be opened through the control means 16 to permit flow of the pressurizing medium to the valves 15a and 15b which are normally closed. For purposes of the system illustrated in FIGURE 1, the control means 16 may open the valve 15a to permit flow of the pressurizing medium through conduit 14 into compartment 5 to move the piston head 6 to the right (FIGURE 1). Conduit 14 therefore is the output conduit for pump 13 which communicates through valve means 15 with either valve 15a or 15b. Conduit 14b is provided for communicating conduit 14a with the output side of the pump 13 through positioning of valve means 15. A conduit 14c is provided which, depending upon the position of valve means 15, will communicate either compartment 5 or 5a with the input side of the pump 13. Thus, a portion of the pressurizing medium flows into conduit 5 through valve 15a and a portion thereof is by-passed through conduit 26 which may be connected to conduit 14 downstream of the pump 13 and upstream of the valve means 15.

The pressurizing medium introduced into the chambers 18 through the conduit 26 rocks the end plates 8 at both ends of the housing 4 to the position shown in FIGURE 3 wherein the shaft is not in contact with the end plates and is free to reciprocate.

If the shaft is to be moved into the left (FIGURE 1) valve means 15 is actuated and thereby communicates conduit 14a with the by-pass line 14b connected to the output side of the pump 13 and simultaneously line 14 is connected to the conduit 14c for return of the pressurizing medium, if any, in compartment 5 to the input side of the pump 13. Similarly, the valve means 15 may be controlled to return the piston to the left (FIGURE 1).

When a pressure differential exists in the compartments 5 and 5a the shaft moves in the direction of low pressure and correspondingly moves the flight control surface or other attitude control means to which the shaft is attached for correcting the orientation of the air or space borne vehicle with which the actuator unit is employed.

When the vehicle flight is terminated, the pump 13 may be deenergized and the control means 16 actuated to prevent flow through the lines 14 and 14a to the compartments 5 and 5a. If desired, the valve 15 may be vented to atmosphere in order to purge the lines 14 and 14a employing passage 20. Similarly control means 16 may be actuated to vent the valves 15a and 15b to atmosphere to thereby purge the compartments 5 and 5a. As the pressure drops in the compartments 5 and 5a the forces acting against the end plate 8 decrease and the end plate rocks back to its contact position with the shaft 7 as appears in FIGURE 2.

Thus it will be appreciated that no additional adjustment need be made to the end plates since the high pressure forces pressurizing the compartments of the housing 4 and operating the actuator unit, in some cases of an order of magnitude of 3000 p.s.i., are utilized to urge the end caps or plates away from contact with the shaft. These pressure forces tend to move the end plate incrementally to the left as shown by the arrow in FIGURE 3. It will also be appreciated that the end cap need only be moved a short distance, for example, .001" to .002" to provide sufficient tolerance space to permit reciprocation of the shaft without metal-to-metal contact between the end plate and the shaft.

Thus, effective sealing is obtained while the actuator unit is operating under the high pressures generated from the pressure source without leakage caused by the minute movement of the end plate outwardly to prevent contact between the plate and the shaft. When operation of this device is terminated, the end plate will then return to contact with the shaft and will prevent entry of dirt or other foreign matter along the shaft.

It will, therefore, be appreciated that we provide reciprocating actuator end plate seal means which effectively protect the elastomeric shaft seal means by permitting metal-to-metal contact between the shaft and the end plate during storage of the actuator unit, and which need not be replaced, removed or adjusted under operating conditions, under which the seal means are urged out of contact with the actuator shaft by the pressures employed to operate the actuator unit.

Although various minor modifications might be suggested by those versed in the art, it should be understood that we wish to embody within the scope of the patent warranted hereon all such embodiments as reasonably and properly come within the scope of our contribution to the art.

We claim as our invention:

1. A linear servomechanism actuator unit comprising: an actuator housing; a reciprocable piston shaft in said housing cooperating therewith to define at least two pressurizable compartments; and at least one piston shaft receiving member closing an end of said housing, said member normally contacting said piston shaft to prevent introduction of foreign matter along said piston shaft into said housing, said member being operatively responsive to pressure forces in said housing to rock from contact with said shaft to thereby permit reciprocating movement of said shaft.

2. A linear servomechanism actuator unit comprising: an actuator housing; a reciprocable piston shaft in said housing cooperating therewith to define at least two pressurizable compartments, and at least one movable end plate having a piston shaft receiving bore therethrough closing an end of said housing, said plate normally contacting said shaft to prevent passage of particles along said shaft into said housing, said plate being operatively responsive to pressure forces in said housing to rock from contact with said piston shaft to thereby permit reciprocating movement of said piston shaft.

3. A linear servomechanism actuator unit comprising: a generally cylindrical actuator housing; a reciprocable piston shaft in said housing cooperating therewith to define at least two pressurizable compartments, and at least one generally cylindrical movable end plate closing an end of said housing and having a piston shaft receiving bore therethrough, said end plate being operatively responsive to pressure forces acting thereagainst to rock from contact with said shaft to thereby permit reciprocating movement of said shaft.

4. A linear servomechanism actuator unit comprising: an actuator housing; a reciprocable piston shaft in said housing cooperating therewith to define a pair of pressurizable compartments; at least one movable end plate closing an end of said housing; and a piston shaft receiving bore through said end plate of irregular contour dimensioned to permit the end plate to contact the shaft to prevent passage of particles along said shaft into said housing and to permit the end plate to rock from contact with said shaft under the influence of pressure, said end plate being operatively responsive to pressure forces acting thereagainst to rock from contact with said shaft to thereby permit reciprocating movement of said shaft.

5. A linear servomechanism actuator unit comprising: an actuator housing; a reciprocable shaft in said housing carrying a fixed head separating the housing into a pair of pressurizable compartments; at least one movable end plate closing an end of said housing and a shaft receiving bore through said end plate of irregular contour dimensioned to permit the end plate to contact the shaft for preventing passage of discrete particles along said shaft into said housing and to permit the end plate to rock from contact with said shaft under the influence of pressure to thereby permit the shaft to reciprocate, said end plate being operatively responsive to pressure forces in said housing to rock from contact with said shaft.

6. A linear servomechanism actuator unit comprising: a generally cylindrical actuator housing; a reciprocable shaft in said housing carrying an annular fixed head separating said housing into a pair of pressurizable compartments; a generally cylindrical flanged end plate closing one end of said housing, the flange of said end plate engaging a shoulder provided by the housing; means for holding said end plate flange against said shoulder; a shaft receiving bore in said end plate of irregular contour dimensioned to permit the end plate to contact said shaft to thereby prevent passage of discrete particles along said shaft into said housing and to permit the end plate to rock from contact with said shaft, said end plate being operatively responsive to pressure forces in said housing to rock from contact with said shaft to permit reciprocating movement of said shaft.

7. A linear servomechanism actuator unit comprising: a generally cylindrical actuator housing; a reciprocable shaft in said housing carrying an annular fixed head separating said housing into a pair of pressurizable compartments; a generally cylindrical flanged end plate closing one end of said housing, the flange of said end plate engaging a shoulder provided by the housing; means for holding said end plate flange against said shoulder; a shaft receiving bore in said end plate of the regular contour dimensioned to permit the end plate to contact such shaft to thereby prevent passage of discrete particles along said shaft to said housing and to permit the end plate to rock from contact with said shaft, a spacer member in the compartment adjacent the end plate and spaced therefrom to define a pressurizable compartment, said end plate being operatively responsive to pressure forces in the said compartment defined by the end plate and said spacer member to rock from contact with said shaft and to thereby permit reciprocating movement of said shaft.

8. A linear servomechanism actuator unit comprising: an actuator housing, a reciprocable shaft in said housing carrying a fixed piston head cooperating therewith to define a pair of pressurizable compartments; a first housing port communicating with one of said compartments; a second housing port communicating with the other of said compartments; a pair of end plates closing the opposed ends of the housing, each of said end plates having a shaft receiving bore therethrough of irregular contour dimensioned to permit the end plate to contact said shaft and thereby prevent passage of discrete particles along said shaft into said housing and to rock from contact with said shaft to permit reciprocation of the shaft, said end plates being operatively responsive to pressure to rock from contact with said shaft, and shaft seals seated in the grooves formed in the end plates.

9. In a linear servomechanism actuator unit including a housing and a reciprocable piston shaft in said housing cooperating therewith to define a pair of pressurizable compartments, the improvement comprising: at least one movable end plate closing an end of said housing, said end plate having a piston shaft bore therethrough of irregular contour dimensioned to permit the end plate to contact the shaft and thereby prevent passage of discrete particles along the shaft into the housing and to permit the end plate to rock from contact with the shaft and thereby permit reciprocating movement of the shaft, said end plate being operatively responsive to pressure to rock from contact with said shaft to permit reciprocating movement of said shaft.

10. A member adapted for closing one end of a linear servomechanism actuator unit including a housing and a reciprocating shaft extending through said housing carrying a fixed head separating the housing into a pair of pressurizable compartments, comprising: a body portion having a shaft receiving bore therethrough of irregular contour dimensioned to permit the end member to contact the shaft to prevent passage of discrete particles along the shaft and to permit the end member to rock from contact with the shaft to thereby permit reciprocating movement of the shaft, said member being operatively responsive to pressure to rock from contact with said shaft.

11. A member adapted for use with linear servomechanism actuator units including a housing and a reciprocating shaft extending through said housing carrying a fixed head separating the housing into a pair of pressurizable compartments, comprising: a body portion having an annular peripheral flange and a shaft-receiving bore therethrough of irregular contour dimensioned to permit the member to contact the shaft to prevent passage of discrete particles along the shaft and to permit the member to rock from contact with the shaft to thereby permit reciprocating movement of the shaft, said member being operatively responsive to pressure to rock from contact with said shaft.

12. An end plate member adapted for closing one end of a linear servomechanism actuator unit including a housing and a reciprocating shaft in said housing carrying a fixed head separating said housing into a pair of pressurizable compartments comprising: a body portion carrying a peripheral annular flange circumscribing a frustoconical major surface and an opposed grooved surface of the body portion, and a shaft receiving bore therethrough of irregular contour dimensioned to permit the member to contact the reciprocating shaft to prevent passage of foreign matter along the shaft and to permit the member to rock from contact with the shaft to permit reciprocating movement of the shaft, said member being operatively responsive to pressure acting against said grooved surface to rock from contact with said shaft.

13. In the method of sealing linear servomechanism actuator units including a housing having a reciprocating shaft extending therethrough carrying a fixed head separating the housing into a pair of pressurizable compartments, the steps comprising: closing at least one end of said housing with an end member having a shaft receiving bore therethrough of irregular contour dimensioned to contact the shaft to prevent passage of foreign matter along said shaft and to rock from contact with said shaft to permit reciprocating movement of said shaft, said member being operatively responsive to pressure to rock from contact with said shaft, and applying pressure against the end member to rock said end member from contact with the shaft to thereby permit reciprocating movement of the shaft.

References Cited in the file of this patent
UNITED STATES PATENTS
2,988,058    Warnecke _____ June 13, 1961